US008680958B2

(12) United States Patent
Radermacher

(10) Patent No.: US 8,680,958 B2
(45) Date of Patent: Mar. 25, 2014

(54) HOUSING FOR AN ELECTRICALLY POWERED DEVICE

(75) Inventor: Harald Josef Guenther Radermacher, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/702,315

(22) PCT Filed: May 23, 2011

(86) PCT No.: PCT/IB2011/052230
§ 371 (c)(1),
(2), (4) Date: Dec. 6, 2012

(87) PCT Pub. No.: WO2011/158142
PCT Pub. Date: Dec. 22, 2011

(65) Prior Publication Data
US 2013/0076466 A1  Mar. 28, 2013

(30) Foreign Application Priority Data
Jun. 16, 2010 (EP) .................................... 10166085

(51) Int. Cl.
*H01H 9/00* (2006.01)
(52) U.S. Cl.
USPC ........................................... 335/206; 439/39
(58) Field of Classification Search
USPC ............... 335/206, 207; 439/38, 39, 217, 218
See application file for complete search history.

(56) References Cited

U.S. PATENT DOCUMENTS

| 4,186,432 | A | * | 1/1980 | Hamacher ...................... 362/647 |
| 4,317,969 | A | * | 3/1982 | Riegler et al. ................ 200/52 R |
| 5,917,392 | A | * | 6/1999 | Finfera ......................... 335/205 |
| 7,592,753 | B2 |  | 9/2009 | Baarman et al. |
| 8,177,560 | B2 | * | 5/2012 | Rohrbach et al. ................ 439/39 |
| 2007/0257625 | A1 | * | 11/2007 | Brison ........................... 315/291 |
| 2009/0111287 | A1 | * | 4/2009 | Lindberg et al. ................ 439/39 |
| 2009/0176383 | A1 | * | 7/2009 | Amotz et al. .................... 439/39 |
| 2013/0187597 | A1 | * | 7/2013 | Eastlack ........................ 320/108 |

FOREIGN PATENT DOCUMENTS

| CN | 200955669 Y | 10/2007 |
| DE | 29715580 U1 | 11/1998 |
| FR | 2609578 A1 | 7/1988 |

\* cited by examiner

*Primary Examiner* — Bernard Rojas
(74) *Attorney, Agent, or Firm* — Mark Beloborodov; Yuliya Mathis

(57) ABSTRACT

There is provided a housing comprising an electrically powered device and electrical connecting means. The (electrical connecting means of the) housing fit an interface means of an electrical power supply. The housing is provided with magnetically activable switching means which in a passive isolation state are open. The magnetically activable switching means prevent an electric current from passing between the electrical connecting means and the electrically powered device. The interface means comprise magnetic activation means enable an electric current to pass between the electrical connecting means and the electrically powered device when the housing has been properly installed.

14 Claims, 4 Drawing Sheets

HOUSING FOR AN ELECTRICALLY POWERED DEVICE

FIELD OF THE INVENTION

The present invention relates in general to a housing for an electrically powered device, and in particular to a housing for an electrically powered device enabling safe installation of the same.

BACKGROUND OF THE INVENTION

For a high market penetration of solid state light sources (LED lamps), at the time being, retrofit lamps are considered quite important. This also includes TL tubes. There are some types of housing for such electrically powered devices which have electrical connecting means (for connecting the electrically powered device to the mains power supply) at opposite ends of the housing. Thus during installation one end may still be exposed whilst the other end has been connected to the mains power supply. There are also some types of housing for such electrically powered devices which have all electrical connecting means at one end. In some cases the mechanical design of the housing, may prevent the "right" electrical connecting means from being connected to the "right" interface means of the mains power supply in a "wrong" way. Thereby unsecure installation may be prevented. But in other cases this does not prevent the electrical connecting means from being connected to the "wrong" interface means or in a "wrong" way.

Thus, with current solutions, there might be a safety issue during installation. The potential hazard described above may relate (only) to LED retrofit electrically powered devices, as their internal structure may provide a current path through the electrically powered device. In contrast to this, a gas filled tube for lighting may not conduct any current unless ignited by the ignition voltage, which may require connection at both ends of the electrically powered device. Hence, due to the nature of the different types of electrically powered devices the installer might not be aware of the potential hazard originating from the uninstalled pins.

Hence, there is a need for an improved lighting arrangement, such as retrofit lamps, enabling more secure installation.

SUMMARY OF THE INVENTION

It is an object of the present invention to overcome this problem, and to provide an improved housing for an electrically powered device.

It is an object of the present invention to provide a housing that fulfills requirements relating to safe handling of the electrically powered device comprised in the housing, and particularly to enable safe installation of the electrically powered device.

Generally, the above objectives are achieved by a housing for an electrically powered device according to the attached independent claim. According to a first aspect of the invention, this and other objects are achieved by a housing for an electrically powered device, the housing having an electrically powered device attached thereto, comprising: electrical connecting means for electrically connecting the electrically powered device to interface means of an electrical power supply, the interface means having magnetic activation means; and magnetically activable switching means; the magnetically activable switching means preventing an electric current from flowing between the electrically powered device and the electrical connecting means unless the magnetically activable switching means are activated by the magnetic activation means in connecting the housing to the interface means.

Advantageously such a housing allows a current to flow between the electrically powered device and the electrical connecting means only when the magnetically activable switching means are activated by the magnetic activation means in connecting the housing to the interface means. Thereby there will not be any voltage present at electrical connecting means which are exposed, hence enabling secure installation.

According to embodiments the housing has at least two electrical connecting means and at least two magnetically activable switching means, the electrical power supply being associated with at least two magnetic activation means, whereby in connecting the housing to the interface means each one of the at least two magnetically activable switching means is activated by a respective one of the at least two magnetic activation means, thereby allowing the electric current to flow between the electrically powered device and the electrical connecting means.

Advantageously the electrical connecting means is paired with magnetically activable switching means, thereby enabling even more secure installation.

According to embodiments the housing has at least two electrical connecting means and at least two magnetically activable switching means, the electrical power supply being associated with one magnetic activation means, whereby in connecting the housing to the interface means each one of the at least two magnetically activable switching means is activated by said one magnetic activation means, thereby allowing the electric current to flow between the electrically powered device and the electrical connecting means.

Advantageously, enabling two magnetically activable switching means to be activated by only one magnetic activation means may allow for a simple and cheap but still effective interface means to be provided. Depending on the number of electrical connections required for the specific application and the geometrical arrangement of the interface, even only one magnetically activable switching means to be activated by only one magnetic activation means may be used as the most simple and cheap but still effective and safe interface means.

According to embodiments the housing has a first end and a second end, and wherein a first of the electrical connecting means is arranged at the first end and a second of the electrical connecting means is arranged at the second end, the first and second electrical connecting means being associated with first and second magnetically activable switching means, respectively.

Advantageously the provision of the electrical connecting means at respective ends of the housing may provide for even more secure installation.

According to embodiments the first and the second of the electrical connecting means are arranged to be connected to respectively a first and a second interface means of the electrical power supply, or vice versa, each interface means having respective magnetic activation means.

According to embodiments connecting the housing exclusively to both first and second interface means allows the electric current to flow between the electrically powered device and the electrical connecting means.

According to embodiments the second end is opposite the first end.

According to embodiments the housing comprises feedback means arranged to provide user feedback relating to activation of the magnetically activable switch.

Advantageously this may allow for a user to receive information relating to whether or not the housing has been successfully installed. The feedback means may thus indicate whether or not the electrically powered device is operational.

According to embodiments the feedback means comprise magnetically activated movable parts.

According to embodiments the magnetically activated movable parts are activated by the magnetic activation means in connecting the housing to the interface.

According to embodiments the electrically powered device is a light source.

Advantageously the disclosed housing may allow secure installation of a light source.

According to embodiments the light source is one from a retrofit tube and a linear TL tube.

According to embodiments the magnetic activation means are of an electrically non-conductive material. Alternatively or in addition, the magnetic activation means may be covered by an electrically non-conductive material.

According to a second aspect of the invention, the above object and other objects are achieved by a luminaire comprising a housing as disclosed above.

According to a third aspect of the invention, the above object and other objects are achieved by an arrangement for an electrically powered device, comprising a housing as disclosed above and an interface for connecting the housing to an electrical power supply.

It is noted that the invention relates to all possible combinations of features recited in the claims. Thus, all features and advantages of the first aspect likewise apply to the second and third aspects, respectively.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
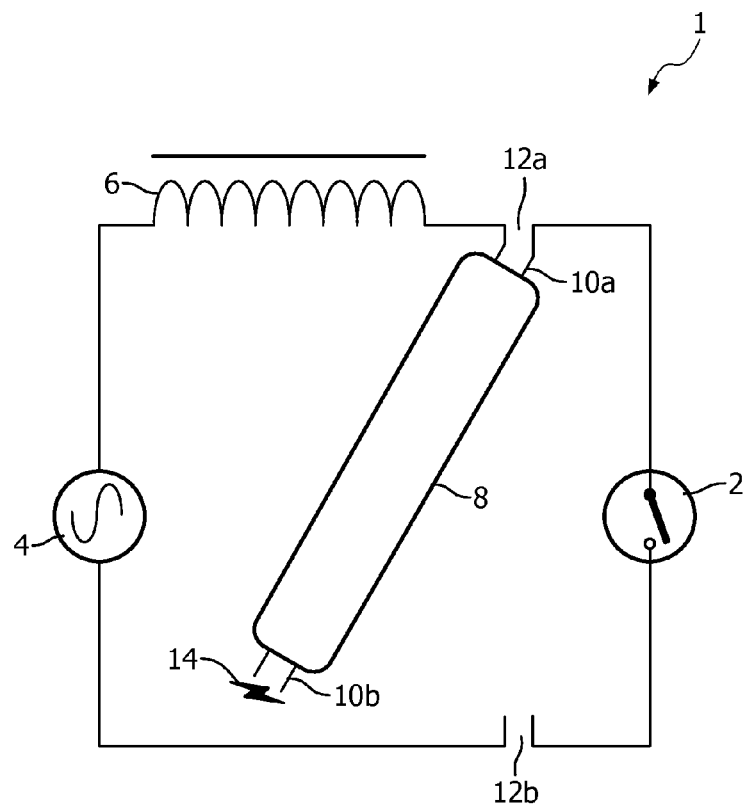
FIG. 1 illustrates a circuit arrangement.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

In order for an electrically powered device to be powered a closed circuit through which electrical current can flow needs to be established. Typical examples of electrically powered devices includes, but are not limited to, light sources, luminaires, LED retrofits of linear TL tubes, and the like. Electrically powered devices are provided with electrical connecting means by which the electrically powered devices can be electrically connected to an interface (such as a device socket or a device holder) of an electrical power supply. Hence, when properly connected to the interface an electrical current may be provided to the electrically powered device. Commonly the electrically powered device has (at least) two electrical connecting means (electrical contacts, such as pins) for connecting the electrically powered device to the electrical power supply (via the interface) to result in a closed current path. Some electrically powered devices have more than two electrical connecting means which enable multiple current paths.

FIG. 1 illustrates a circuit arrangement 1 comprising a housing 8 of a partially installed electrically powered device. The housing 8 has electrical connecting means 10*a-b* for electrically connecting the electrically powered device to an electrical power supply 4 via interfaces 12*a-b*. The circuit arrangement 1 further comprises inductive circuitry 6 and a switch 2. The inductive circuit is typically the magnetic ballast while the switch 2 is typically the (glow) starter. During installation of the electrically powered device (i.e. when mechanically and electrically connecting the electrically powered device to the electrical power 4 supply via the interfaces 12*a-b*) one (pair) of the electrical connecting means 10*b* may be exposed while the other (pair) of the electrical connecting means 10*a* has been connected to interface 12*a*. Thereby a voltage may be present at the exposed (pair) of the electrical connecting means 10*b*, as schematically illustrated at 14. A closed circuit may therefore be formed when contacting the exposed (pair) of the electrical connecting means, thereby enabling an electrical current to flow through the electrically powered device via the exposed (pair) of the electrical connecting means 12*b*.

Particularly, the inventors of the disclosed embodiments have discovered that there may be an issue with the safety of LED retrofits of linear TL tubes. During installation, it may be possible to insert the electrical connecting means of only one end of the TL tube into the interface of the electrical power supply whilst having the electrical connecting means of the other end still exposed. As a consequence thereof, if an installer (by accident) touches the electrical connecting means on the exposed end he/she may receive an electrical shock from the exposed end. This is especially true since the electrical supply grid is often not isolated from the ground potential. An installer, touching the still exposed connection means may be exposed to a hazardous current flowing through his body to ground and from the ground back to the electrical power supply. Even if there would be a single-pole switch in the off position in one of the connections to the power supply, depending on the position of this switch and the grounding condition, there can still be a current path. Thus, even if the electrically powered device (for example, a light source), which is to be replaced, is not fully connected (for example, the light source does not emit light), this does not guarantee that there will not be a hazardous situation.

Furthermore, for most common electrical connecting means (connectors), where all pins of the electrical connecting means are at the same end (for example the normal mains plug of an electrically powered device), it is (due to the length of the pins and the size of the socket) not possible to connect only one pin whilst leaving the other pin exposed so that it may be (accidentally) touched. However, there are also some types of housing which have all electrical connecting means at one end (such as on a bottom side, on a top side or on another side of the housing). In some cases the mechanical design (geometry, shape, etc.) of the housing and/or interface, possibly together with the placing of the electrical connecting means on the housing, may prevent the electrical connecting means from being connected to the interface means in a "wrong" way, and thereby prevent unsecure installation. But in other cases this does not prevent the electrical connecting means from being connected to the interface means in a "wrong" way.

The potential hazard described above may relate (only) to retrofit tubes, as the power converter/ballast provides a current path through the tube. In contrast to this, a gas filled tube may not conduct any current unless ignited by the ignition voltage, which may require connection at both ends of the electrically powered device. Hence, due to the nature of the different types of electrically powered devices the installer might not be aware of the potential hazard originating from the uninstalled pins.

According to embodiments there is disclosed a housing for an electrically powered device which is provided with magnetically activated switching means. The magnetically activated switching means, which may be embodied as reed contacts in the retrofit tube, isolate (disconnect) the electrical connecting means in a first state, thereby preventing current to flow between the electrically powered device and the electrical connecting means. Corresponding magnetic activation means for activating the switching means, and thereby allowing current to flow between the electrically powered device and the electrical connecting means, is installed in the interface (such as in the lamp holder) of the electrical power supply. Thus, only the electrical connecting means (such as pins) which are correctly placed in the interface (such as a lamp holder) will be electrically connected. Thereby the safety risk may be reduced or even removed.

Figure 2:
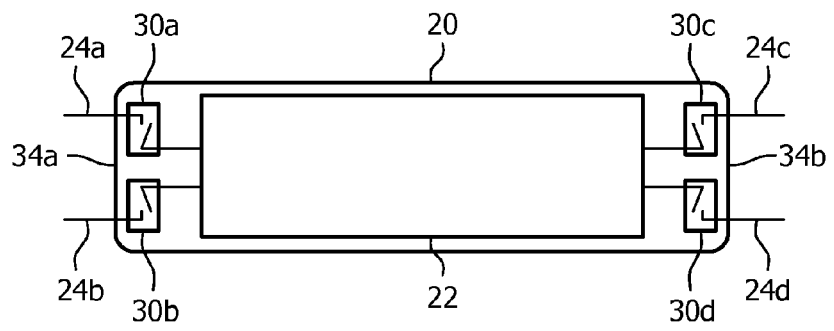
FIG. 2 illustrates a housing for an electrically powered device according to an embodiment.

With reference to FIG. 2 there is provided a housing 20 for an electrically powered device 22. The housing may be a glass housing. The housing may comprise a gas filling. The housing 20 has an electrically powered device 22 attached thereto. According to a preferred embodiment the electrically powered device 22 is a light source. The light source may be a retrofit tube. The light source may be a linear tubular lamp (TL) tube. According to a preferred embodiment the housing is part of a luminaire comprising the housing 20 and the electrically powered device (embodied as a light source).

The housing 20 comprises electrical connecting means 24a-d. The electrical connecting means 24 are arranged to electrically connecting the electrically powered device 22 to interface means 26a-b of an electrical power supply 4 (see FIG. 3). The interface means 26a-b may be embodied as device sockets or device holders.

Further, the housing 20 comprises magnetically activable switching means 30a-d. The magnetically activable switching means 30a-d may comprise reed contacts. The magnetically activable switching means 30a-d are activated by the magnetic activation means 28a-b provided in the interface means 26a-b (see FIG. 3). The magnetically activable switching means 30a-d are arranged to, in a first state, prevent an electric current from flowing between the electrically powered device 22 and the electrical connecting means 24a-d. The current flow is prevented unless the magnetically activable switching means 30a-d are activated by the magnetic activation means 28a-d. In the first state, either all the magnetically activable switching means 30a-d or at least the magnetically activable switching means 30a-d on one end 34a-b of the housing 20 are in the open state (see below). The first situation (i.e. all magnetically activable switching means 30a-d are in the open state) occurs when no end of the housing 20 is inserted into the interface means 26a-b. The second situation (i.e. magnetically activable switching means 30a-d at least on one end are in the open state) occurs when only one end of the housing 20 is inserted into the interface means 26a-b. The magnetically activable switching means 30a-d are activated (thereby entering a second state) by the magnetic activation means 28a-d in connecting the housing 20 to the interface means 26a-b, thereby allowing electrical power to be provided from the power supply to the electrically powered device. In other words, in the first state, which may also be denoted as a passive state, current is prevented from flowing between the electrically powered device 22 and the electrical connecting means 24a-d, whereas in the second state, which may also be denoted as an active state, current is allowed to flow between the electrically powered device 22 and the electrical connecting means 24a-d.

An arrangement for an electrically powered device 22 may comprise a housing 20 according to the above and an interface means 28a-b for connecting the housing to an electrical power supply according to the above. In summary, there will be no current flow possible, unless the magnetically activable switching means are magnetically activated.

Figure 3:
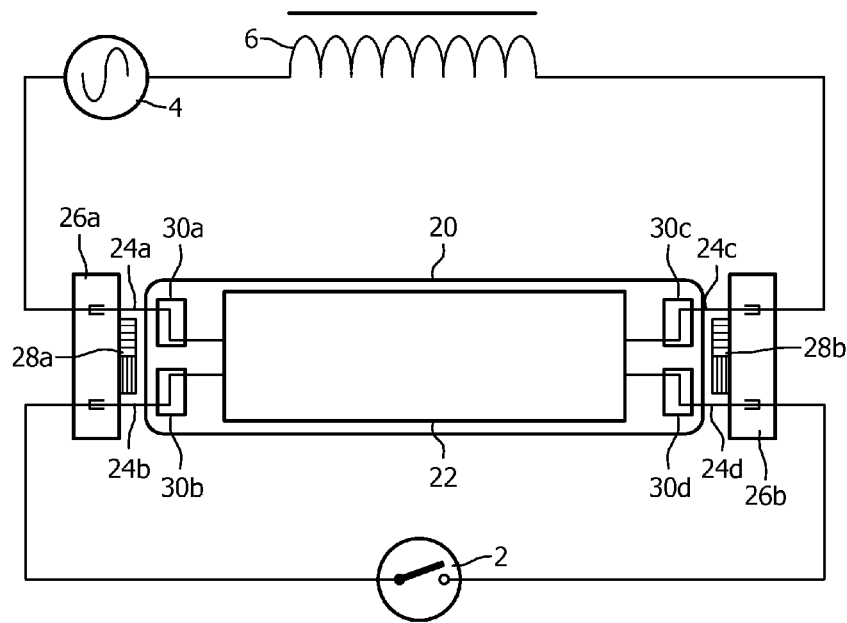
FIGS. 3-6 illustrates housings for an electrically powered device and interfaces according to embodiments.

As noted above the interface means 26a-b are provided with magnetic activation means 28a-b. FIG. 3 illustrates a housing 20 for an electrically powered device 22 as described with reference to FIG. 2. In FIG. 3 the electrically powered device 22 has been electrically connected to a electrical power supply 4 via the interface means 26a-b. The interface means 26a-b are provided with magnetic activation means 28a-b. Thereby the magnetic activation means 28a-b have activated the magnetically activable switching means 30a-d enabling a current to flow between the electrical power supply 4 and the electrically powered device 22. The magnetic activation means 28a-b in the interface means 26a-b are preferably from a non-conductive material, e.g. (self adhesive) magnetic plastic tape or covered by a non-conductive material. According to a preferred embodiment the magnetic activation means 28a-b may thus be of a non-conductive material. For example, the magnetic activation means 28a-b may be embodied as a magnetic plastic tape, as magnetic paint, as magnetically filled compound, or the like. Alternatively the magnetic activation means can be a magnet or of a magnetically conductive material, such as iron.

Figure 4:
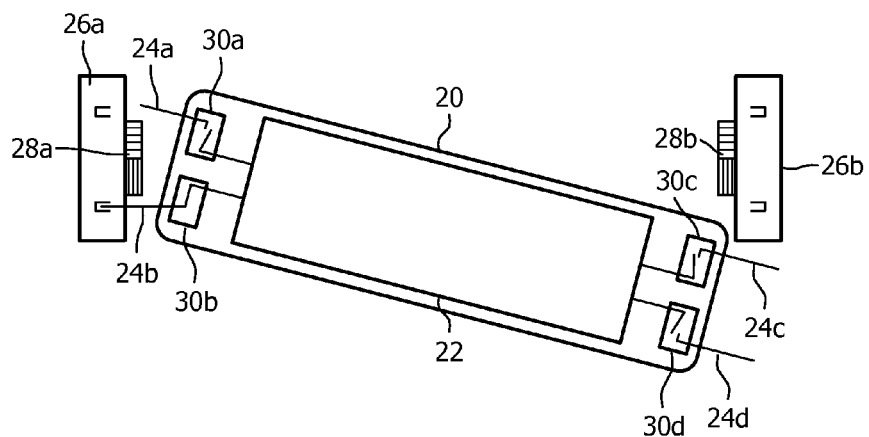

FIG. 4 illustrates a partially installed electrically powered device 22 comprised in a housing 20. In case the housing 20 is not correctly installed, as shown in FIG. 4, the exposed electrical connecting means 24c-d will be disconnected, so there is no issue with safety (in contrast to the arrangement 1 illustrated in FIG. 1). In more detail, as is apparent from the above a housing 20 comprising the disclosed magnetically activable switching means 30a-d is (from safety point of view) fool proof. If the magnetic activation means 28a-b are not properly installed on the interface means 26a-b the electrically powered device 22 will not be able to receive any current through the electrical connecting means 24a-d since the magnetically activable switching means 30a-d will remain in the passive state. In other words, if the installer forgets to install the magnets into the lamp holder, the lamp will not work, but there will still be no hazardous situation possible. In FIG. 4 electrical connecting means 24b has been properly installed (e.g. positioned into the interface means 26a (such as a lamp holder) in the right orientation) and the magnetically activable switching means 30b has been activated by magnetic activation means 28a whilst electrical connecting means 24a, c-d have not been properly installed (according to the present exemplary embodiment they are still outside the intended position of the interface means 26a-b). Thus the magnetically activable switching means 30a, c-d have not been activated by magnetic activation means 28a-b.

Each electrical signal is routed through a magnetically activated switching means 30*a-d*. In case all pins on each side are short circuited, this is only one signal per end and only one switch per end is required. In the general case, it might be beneficial to treat the electrical connecting means 24*a*, 24*b*, 24*c*, 24*d* per end separately. In this case two magnetically activable switching means (30*a*, 30*b* and 30*c*, 30*d*, respectively) may be required per end. In more detail, the housing 20 may have a first end 34*a* and a second end 34*b*. The second end 34*b* may be opposite the first end 34*a*. The two electrical connecting means (24*a*, 24*b* and 24*c*, 24*d*, respectively) may be on different ends of the housing. For example, a first of the electrical connecting means 24*a-b* may be arranged at the first end 34*a*. A second of the electrical connecting means 24*c-d* may be arranged at the second end 34*b*. The first and the second electrical connecting means may also be associated with first and second magnetically activable switching means, respectively.

According to an embodiment the housing 20 has at least two electrical connecting means 24*a-d* and at least two magnetically activable switching means 30*a-d*. Further, the electrical power supply 4 is associated with two magnetic activation means 28*a-b*. In connecting the housing 20 to the interface means 26*a-b* each one of the at least two magnetically activable switching means 30*a-d* is activated by a respective one of the two magnetic activation means 28*a-b*. For example, there may be (at least) two electrical connecting means 24*a-d* on each end of the housing 20 or, alternatively, one electrical connecting means 24*a-d* at each side of the housing 20. In any of these two cases, each one of the electrical connecting means 24*a-d* is, according to the present embodiment, associated with one magnetically activable switching means 30*a-d* wherein each interface means 26*a-b* has one magnetic activation means 28*a-b*. For example, the first and the second of the electrical connecting means 24*a-d* may be arranged to be connected to respectively a first and a second interface means 26*a-b* of the electrical power supply 4, or vice versa. Each interface means 26*a-b* may, according to an embodiment, have respective magnetic activation means 28*a-d*. Preferably, the housing can be operated in all such positions where all (pins of) the electrical connecting means 24*a-d* are connected to (a connector of) the interface means 26*a-b*. Preferably the housing 20 has two equal ends and can be installed in an arbitrary orientation. In other words this should not be interpreted as the fits of the first and second interface means are different. Exclusively connecting the housing to both first and second interface means will allow the electric current to flow between the electrically powered device and the electrical connecting means.

Figure 5:
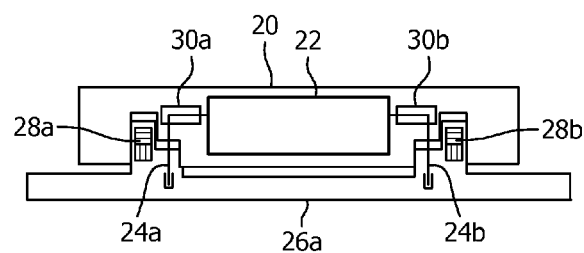

FIG. 5 is a side view of a housing 20 according to an embodiment. The housing 20 may from the top or bottom have a circular shape and may, for example, hold an electrically powered device 22 in form of a light source to be attached to an interface means 26*a* of a socket attached to, for example, a ceiling, a floor, a machine, a piece of furniture or a wall. The housing 20 comprises magnetically activable switching means 30*a-b* arranged to be activated by magnetic activation means 28*a-b* allowing or preventing, depending on the state of the magnetically activable switching means, a current to flow between electrical connecting means 24*a-b* and the electrically powered device 22. According to the exemplary embodiment illustrated in FIG. 5 the shape of the housing 20 and interface means 26*a* may prevent the housing from being attached to the interface means 26*a* in an erroneous way.

Figure 6:
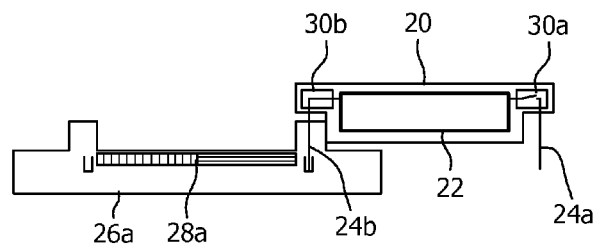

FIG. 6 is a side view of a housing 20 according to an embodiment attached to an interface means 26*a* according to an embodiment in an erroneous way. According to this exemplary embodiment, the shape of the housing 20 and/or the shape of the interface means 26*a* do not necessarily prevent the housing 20 from being attached to the interface means 26*a* in an erroneous way: electrical connection means 24*b* is allowed to be in electrical contact with the power supply (not shown) whilst electrical connection means 24*a* is exposed. One magnetically activable switching means 30*b* is activated by magnetic activation means 28*a* thereby connecting one pin of the electrically powered device 22 to the power supply whilst electrical connecting means 24*a* are exposed. However, the magnetically activable switching means 30*a* is not activated by magnetic activation means 28*a*, thereby preventing a current to flow between the exposed electrical connecting means 24*a* and the electrically powered device 22, hence preventing any hazard when touching the exposed pin of the electrical connecting means 24*a*. In connecting the housing 20 to the interface means 26*a* in the right way (similar to the housing 20 and interface means 26*a* as oriented in FIG. 5, mutatis mutandis) each one of the at least two magnetically activable switching means 30*a-b* is activated by the one (single) magnetic activation means 28*a*. Such an arrangement may be suitable if the distance between electrical connecting means 24*a-b* is chosen such that the magnetic effect of only one (single) magnetic activation means 28*a* is sufficient in order to activate all magnetically activable switching means 30*a-b*.

In a further embodiment, on single magnetically activable switching means 30*a* may be located in the housing 20 at a suitable position, e.g. in the centre. This magnetically activable switching means may be connected to either electrical connecting means 24*a* or 24*b* directly. Due to the position of the magnetically activable switching means, it will not be activated when housing 20 is mounted incorrectly (as in FIG. 6). Instead it will only be activated by the central activation means 28*a* when the housing is mounted correctly (as in FIG. 5).

Figure 7:
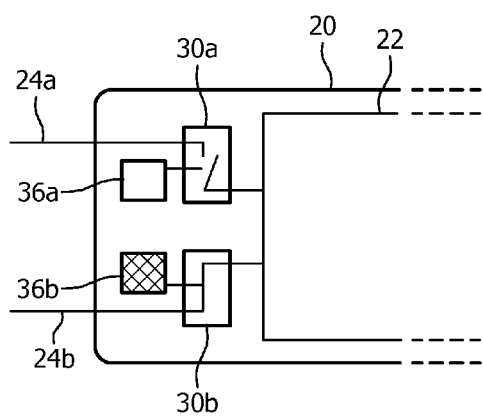
FIG. 7 illustrates part of a housing for an electrically powered device according to an embodiment.

To ease the installation progress, feedback means could be present in or on the housing, thereby providing an optical indication of a missing magnetic activation signal. FIG. 7 illustrates part of a housing 20 and part of an electrically powered device 22 comprising electrical connecting means 24*a-b* and magnetically activable switching means 30*a-b*. Feedback means 36*a-b* in the housing 20 may be activated via the magnetic field of the magnetic activation means 30*a-b* and may be visible from the outer side of the housing. Without being magnetically activated these feedback means 36*a-b* may be visible to indicate that the housing 20 is disconnected from the interface of the electrical power supply (as is the case for feedback means 36*a*). Alternatively the indicator may be in a visible position as soon as the housing is installed (as is the case for feedback means 36*b*). Color may for example be used for indication. According to an embodiment the housing 20 thus comprises feedback means 36*a-b* arranged to provide user feedback relating to activation of the magnetically activable switching means 30*a-b*. The feedback means 36*a-b* may be at least partly visible by a user. The feedback means may, for example, comprise magnetically activated movable parts. The magnetically activated movable parts may be activated by the magnetic activation means in connecting the housing to the interface.

In order for the magnetically activable switching means 24 to be activated, a certain magnetic flux or field strength is required. In addition to the sole magnetically activable switching means, the housing may comprise magnetically conductive material (e.g. iron) to guide the magnetic flux from the area where the housing is exposed to the magnetic activation means 28 to the magnetically activable switching means. In such a case, the magnetic activation means may be a magnet. It is also possible that the housing comprises a magnet. In this case the magnetic loop is designed in such a way that the magnetic activation means 28 are required to close the magnetic loop in order to provide the required magnetic flux at the position of the magnetically activable switching means. In such a case, the magnetic activation means may be a magnetically conducive material, e.g. iron. Combinations of the above are possible too. The magnetic activation means 28 may comprise both a magnet and a piece of iron and both the magnet and the piece or iron may be required to provide the required magnetic flux at the position of the magnetically activable switching means 24. This combination provides good protection against false activation of the magnetically activable switching means, since a sole magnet or piece of iron will not activate the magnetically activable switching means.

Figure 8:
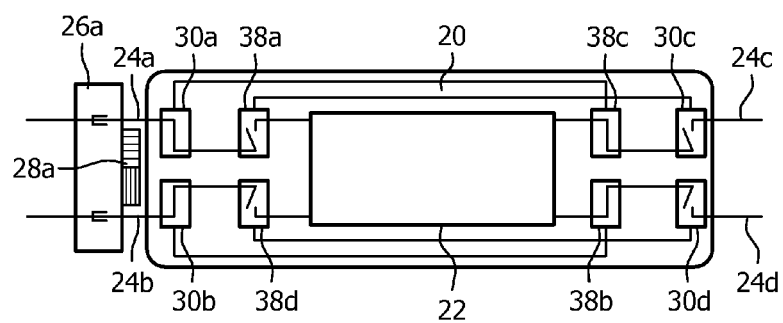
FIG. 8 illustrates a housing for an electrically powered device according to an embodiment.

FIG. 8 illustrates a housing 20 similar to the housing of FIGS. 2-7 according to an embodiment. According to the embodiment illustrated in FIG. 8 the magnetically activable switching means 30a is paired with a switch 38a. An indication relating to the state of the magnetically activable switching means 30a is communicated to the switch 38a so that the switch 38a and the magnetically activable switching means 30a have the same state. The indication may be provided by means of a mechanical connection between the magnetically activable switching means 30a and the switch 38a. Alternatively, the indication may be provided by means of an electrical signal powered by an internal power source (such as a battery) comprised in the housing 20. Thus, when the magnetically activable switching means 30a is activated by magnetic activation means 28a this causes the switch 38a also to be in the "active state" (as illustrated in FIG. 8) by the indication relating to the state of the magnetically activable switching means 30a. The magnetically activable switching means 30a may be regarded as master unit and the switch 38a may be regarded as a slave unit. Likewise, magnetically activable switching means 30b is paired with a switch 38b; magnetically activable switching means 30c is paired with a switch 38c; and magnetically activable switching means 30d is paired with a switch 38d. The switches 38a-d are themselves not magnetically activated by the magnetic activation means 28a—they are controlled by a respective one of the magnetically activable switching means 30a-d. Hence, according to this embodiment, current can flow to and/or from the electrically powered device 22 at any end of the housing 20 if and only if all switches 30a-d have been activated.

A common property of the disclosed embodiments is the possibility to provide a solution for retrofit electrically powered devices, such as an retrofit tube. Thus, a normal fixture may be used as a starting point. A procedure for equipping the interface means of the electrical power supply with the required magnetic activation means, such as iron pieces, may comprise the step of properly mounting a magnetic activation means to the interface in order to allow proper operation of the electrically powered devices. In relation to this there is provided a tool for mounting a magnetic activation means to an interface. The tool is arranged to clean the interface. The tool is further arranged to retrieve magnetic activation means from a magnetic activation means magazine, to positioning the magnetic activation means correctly and mounting the magnetic activation means so that it sticks to the interface.

The disclosed housing arrangement will work with any electrical circuitry inside the housing and any wiring and ballasting method of the luminaire comprising the interface means 26 (such as, but not limited to magnetic ballast, glow starter, electronic starter, series connection of lamps, HF cold start, HF warm start, shorted pins per end, and the like).

Although a magnetically activated switching means are preferred according to an embodiment, a mechanically activated switch may also be used. However, a mechanically activated switch may (by accident) be pressed by the user during installation. Thereby the user may in fact disable the safety feature of the housing. Also, it may be difficult to construct mechanically activated switches which on the one hand cannot be activated by users but on the other hand can guarantee to be activated when being installed into the interface. In contrast to this, the disclosed magnetic activation is both simple and safe, because it is not possible to active the switches without a special tool. In addition, reed contacts fit well with tube manufacturing, as both tube and reed contacts are suitable for a glass housing with a gas filling.

In summary, the disclosed subject matter prevents an electrical current to be delivered to the body of person installing the housing). Thus a current may be provided to the electrically powered device comprised in the housing only when the housing, via its electrical connecting means, has been properly installed. Such a housing comprises a load in terms of an electrically powered device, which may be a LED tube. The housing also comprises electrical connecting means, which may take the form of touchable electrical contact pins. The (electrical connecting means of the) housing is realized to fit with an interface means (such as a predefined holder, such as an existing fixture) of an electrical power supply. The housing is provided with magnetically activable switching means which in a passive isolation state are open. The magnetically activable switching means may thus be said to serve as isolation means for isolation the electrical connecting means when the housing has not been properly installed, thereby preventing an electric current from passing between the electrical connecting means and the electrically powered device. The interface means comprise magnetic activation means serving as activation means for bringing the isolation means into an active non-isolation state when the housing is properly installed into the interface means, thereby allowing an electric current to pass between the electrical connecting means and the electrically powered device.

The person skilled in the art realizes that the present invention by no means is limited to the preferred embodiments described above. On the contrary, many modifications and variations are possible within the scope of the appended claims.

The invention claimed is:

1. A housing for an electrically powered device, the housing having an electrically powered device attached thereto, comprising:
   electrical connecting contacts for electrically connecting the electrically powered device to an interface of an electrical power supply, the interface having magnetic activation elements; and
   a magnetically activable switch;
   the magnetically activable switch configured to prevent an electric current from flowing between the electrically powered device and the electrical connecting contacts unless the magnetically activable switch is activated by the magnetic activation elements in connecting the housing to the interface,
   wherein the housing has at least two electrical connecting contacts and at least two magnetically activable switches, the electrical power supply being associated with one of the magnetic activation elements, whereby in connecting the housing to the interface the at least two magnetically activable switches is activated by the magnetic activation elements, thereby allowing the electric current to flow between the electrically powered device and the electrical connecting contacts.

2. The housing according to claim 1, wherein the housing has at least two electrical connecting contacts and at least two magnetically activable switches, the electrical power supply being associated with at least two magnetic activation elements, whereby in connecting the housing to the interface, each one of the at least two magnetically activable switch are activated by a respective one of the at least two magnetic activation elements, thereby allowing the electric current to flow between the electrically powered device and the electrical connecting contacts.

3. The housing according to claim 1, wherein the housing has a first end and a second end, and wherein a first of the electrical connecting contacts is arranged at the first end and a second of the electrical connecting contacts is arranged at the second end, the first and second electrical connecting contacts being associated with first and second magnetically activable switch, respectively.

4. The housing according to claim 3, wherein the first and the second of the electrical connecting contacts are arranged to be connected to respectively a first and a second interface of the electrical power supply, or vice versa, each interface having respective magnetic activation elements.

5. The housing according to claim 4, wherein connecting the housing exclusively to both first and second interface allows the electric current to flow between the electrically powered device and the electrical connecting contacts.

6. The housing according to claim 3, wherein the second end is opposite the first end.

7. The housing according to claim 1, wherein the housing comprises feedback means arranged to provide user feedback relating to activation of the magnetically activable switch.

8. The housing according to claim 7, wherein the feedback means comprise magnetically activated movable parts.

9. The housing according to claim 8, wherein the magnetically activated movable parts are activated by the magnetic activation elements in connecting the housing to the interface.

10. The housing according to claim 1, wherein the electrically powered device is a light source.

11. The housing according to claim 10, wherein the light source is one from a retrofit tube and a linear TL tube.

12. The housing according to claim 1, wherein the magnetic activation elements are of a non-conductive material.

13. A luminaire comprising a housing according to claim 1.

14. An arrangement for an electrically powered device, comprising a housing according to claim 1 and an interface for connecting the housing to an electrical power supply.

* * * * *